United States Patent
Iverson et al.

(10) Patent No.: US 6,411,696 B1
(45) Date of Patent: Jun. 25, 2002

(54) SYSTEM FOR FINDING A USER WITH A PREFERRED COMMUNICATION MECHANISM

(75) Inventors: Vaughn S. Iverson, Beaverton; John W. Richardson, Portland, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/775,507

(22) Filed: Dec. 31, 1996

(51) Int. Cl.$^7$ .......................... H04M 1/64; H04M 1/56; H04M 3/42
(52) U.S. Cl. .............................. 379/201.06; 379/88.12; 379/88.13; 379/142.07; 379/201.01; 379/265.09; 379/908
(58) Field of Search .............................. 379/67.1, 88.12, 379/88.01, 88.13, 88.18, 93.09, 201, 88.14, 210, 219, 220, 221, 70, 88.15, 88.17, 142.07, 142.14, 201.01, 201.06, 201.07, 201.11, 211.02, 212.01, 265.09, 908; 704/104, 243, 260; 709/217, 219, 203

(56) References Cited

U.S. PATENT DOCUMENTS

| | | | | |
|---|---|---|---|---|
| 5,157,759 A | * | 10/1992 | Bachenko | 395/2 |
| 5,327,486 A | * | 7/1994 | Wolff et al. | 379/93.23 |
| 5,333,173 A | * | 7/1994 | Seazholtz et al. | 379/45 |
| 5,333,266 A | * | 7/1994 | Boaz et al. | 395/200 |
| 5,402,478 A | * | 3/1995 | Hluchyj et al. | 379/221 |
| 5,416,834 A | * | 5/1995 | Bales et al. | 379/211 |
| 5,471,519 A | * | 11/1995 | Howe et al. | 379/67 |
| 5,500,919 A | * | 3/1996 | Luther | 395/2.69 |
| 5,557,659 A | * | 9/1996 | Hyde-Thomson | 379/88 |
| 5,568,540 A | * | 10/1996 | Greco et al. | 379/89 |
| 5,581,600 A | * | 12/1996 | Watts et al. | 379/67.1 |
| 5,608,786 A | * | 3/1997 | Gordon | 379/100 |
| 5,652,789 A | * | 7/1997 | Miner et al. | 379/201 |
| 5,722,418 A | * | 3/1998 | Bro | 128/732 |
| 5,742,905 A | * | 4/1998 | Pepe et al. | 455/461 |
| 5,754,766 A | * | 5/1998 | Shaw et al. | 395/200.3 |
| 5,757,892 A | * | 5/1998 | Blanchard et al. | 379/93.26 |
| 5,757,904 A | * | 5/1998 | Anderson | 379/265 |
| 5,835,087 A | * | 11/1998 | Herz et al. | 345/327 |
| 5,884,262 A | * | 3/1999 | Wise et al. | 704/270 |
| 5,884,270 A | * | 3/1999 | Walker et al. | 705/1 |
| 5,946,386 A | * | 8/1999 | Rogers et al. | 379/265 |
| 6,029,195 A | * | 2/2000 | Herz | 709/219 |

* cited by examiner

*Primary Examiner*—Allan Hoosain
(74) *Attorney, Agent, or Firm*—Blakely, Sokoloff, Taylor & Kafman LLP

(57) ABSTRACT

A system for handling incoming media events based on content and state information. An interface which receives events transmitted via a plurality of media forwards such incoming events into an attribute extractor. The attribute extractor extracts one or more attributes from the event and passes those attributes to a characteristic accumulator. The attribute extractor may, for example, read the header of an e-mail event to determine its source or, for example, employ caller ID in conjunction with voice recognition to determine the identity of a caller.

The characteristic accumulator creates a characterization of an event on which a decision engine can base a decision of how the event should be handled. The characterization includes all extracted attributes as well as state information deemed relevant to such attributes. The decision engine will typically employ rule-based decision-making using the characterization as a starting point. The decision unit should decide both whether the event should be forwarded and along what outgoing media type. If the outgoing media type is not the same as the incoming media type, appropriate translation is provided.

18 Claims, 3 Drawing Sheets

|  | Outgoing | | |
|---|---|---|---|
| Incoming | Voice Phone | E-mail | Pager |
| Phone | Forward | STT first line live, response allows delivery of remainder | Forward attributes caller # and name if 2-way allow to specify forward #. |
| Text | TTS - subject From - whom option to prompt for more | Forward | Subject and source option to prompt for more |

FIG. 2

SYSTEM FOR FINDING A USER WITH A PREFERRED COMMUNICATION MECHANISM

BACKGROUND OF THE INVENTION

Related Art

Answering machines, voice mail, and e-mail delivery systems have been around for many years and are generally well-known in the art. More recently, there has been a proliferation of call forwarding systems. These systems, for example, might operate as follows: if a user does not answer the office telephone, the system switches the call to the user's cellular line; if no answer is received on the cellular line, the call is switched to a pager.

Answering machine technology has also advanced. Some answering machines now permit the user to establish a series of call forwarding numbers to which messages left on the machine may be forwarded. These typically take the form of: 1) a CALLER leaving a message; 2) the answering machine calling the programmed number to which the USER has explicitly requested call be forwarded; and 3) when the forwarded phone is answered, the answering machine says, e.g., "I have a message from USER." If USER is present, USER can enter its access code and retrieve the message.

This and other prior art systems suffer from two major deficiencies: 1) they do not and cannot make content and state based decisions on how an incoming event (be it a phone call, e-mail message or other type of communication), should be handled, and 2) they are not capable of handling translation between multiple media types in the event that the user is not readily reachable on the incoming media type.

As previously mentioned, prior art systems do not have the capability of making content-based decisions. At most, such systems allow a caller to, e.g., select a mailbox based on subject by pressing a key on a touch-tone keypad. Different mailboxes may have different priorities. However, nothing prevents a caller from accidentally or intentionally entering the message in a mailbox having an artificially high priority or incorrectly categorieed by subject. When this occurs, the user will be unnecessarily disturbed, since the system will blindly deliver the message in accordance with its preestablished protocol.

As to multiple media types, a media type consists of a transport type and a data type. If either the transport type or the data type are different, the media are considered different types. For example, phone and fax have the same transport type, but different data types. Thus, they are different media types. Additionally, within each media type, there are different channels. For example, different telephone numbers constitute different channels in a telephone system, and different e-mail addresses constitute different channels in that medium. The challenge is to deliver an incoming important event along a media type and channel such that the user receives enough of the event to act on it within the shortest time period while screening unimportant events so the user is not unnecessarily interrupted.

In view of the foregoing, it would be desirable to be able to provide a system which is capable of appropriately handling incoming events on a plurality of incoming media and forwarding those events based on content and/or state information to a user on a best of a plurality of outgoing media.

BRIEF SUMMARY OF THE INVENTION

A system for handling incoming media events based on content and state information is disclosed. An interface which receives events transmitted via a plurality of media forwards such incoming events into an attribute extractor. The attribute extractor extracts one or more attributes from the event and passes those attributes to a characteristic accumulator. The attribute extractor may, for example, read the header of an e-mail event to determine its source or, for example, employ caller ID in conjunction with voice recognition to determine the identity of a caller.

The characteristic accumulator creates a characterization of an event on which a decision engine can base a decision of how the event should be handled. The characterization includes all extracted attributes as well as state information deemed relevant to such attributes. The decision engine will typically employ rule-based decision-making using the characterization as a starting point The decision unit should decide both whether the event should be forwarded and along what outgoing media type. If the outgoing media type is not the same as the incoming media type, appropriate translation is provided.

BRIEF DESCRIPTION OF THE DRAWINGS

FIG. 2 is a sample 2×3 translation array of one embodiment of the invention.

DETAILED DESCRIPTION OF THE INVENTION

Figure 1:
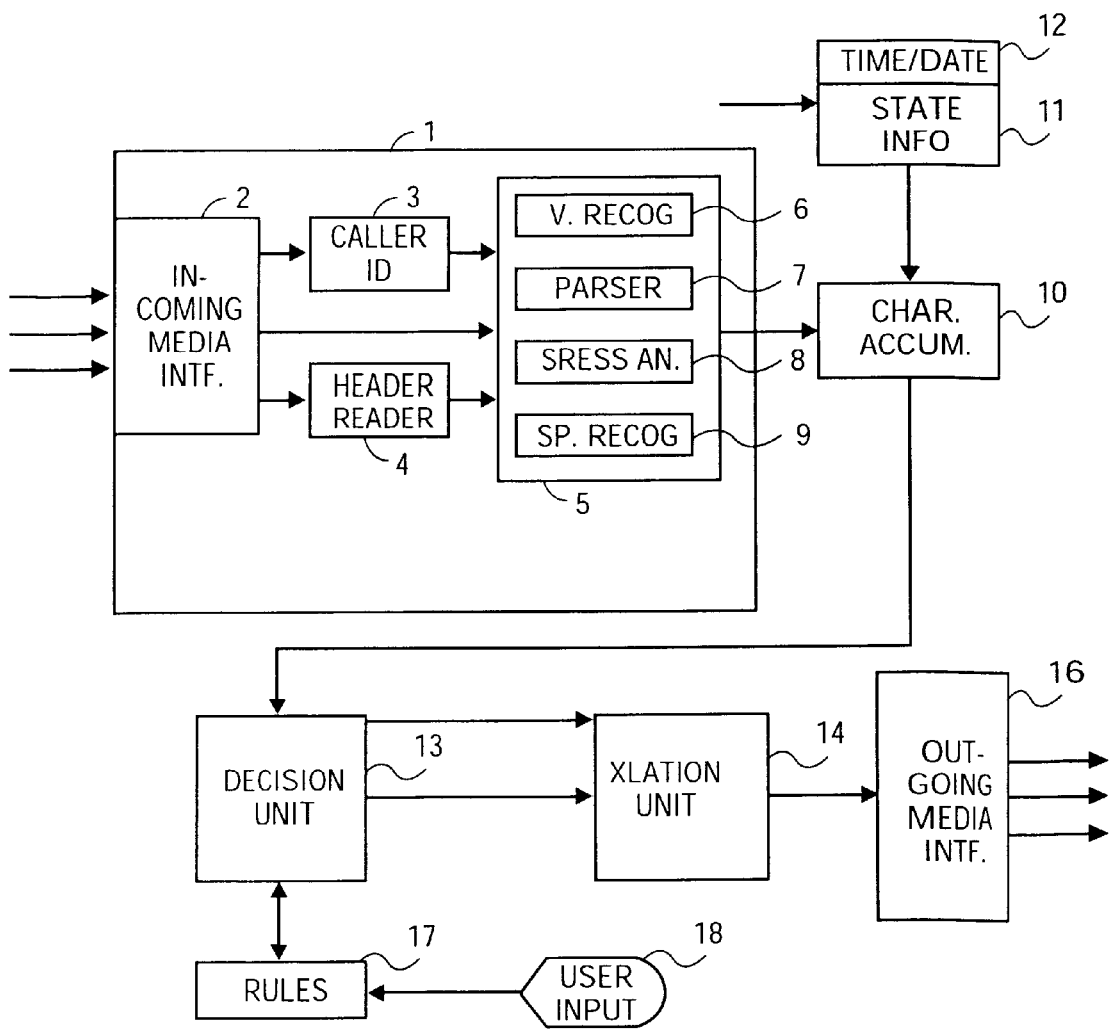
FIG. 1 is a functional block diagram of an embodiment of the invention.

FIG. 1 shows a block diagram of one embodiment of the invention. An attribute extractor 1 has an incoming media interface 2 which accepts events from two or more different media types. The interface 2 is basically a collection of media interfaces which are individually well-known in the art. Telephone, fax, and e-mail interfaces are all well-known in the art.

In one exemplary embodiment, incoming media include any subset of the following: telephone, e-mail, radio frequency transmission, and fax. The interface 2 forwards an incoming event to a transport specific attribute extractor 3, 4 or directly to a data attribute extractor 5 which contain extraction units for different data types. A Caller ID unit 3 is an example of a transport specific attribute extractor applicable to telephone calls and faxes. Header reader 4 is an example of a transport specific attribute extractor for e-mail. Data attribute extractor 5 includes attribute extraction units which extract attributes from the data types. For example, voice recognition unit 6 may be employed anytime the event has a voice data component This would include telephone calls and, for example, short-wave radio events. The voice recognition unit 6 should not be confused with speech recognition unit 9. The voice recognition unit 6 compares a voice print of an event with voice prints that are maintained in the system to determine the identity of the speaker. Conversely, speech recognition unit 9 can be used to identify a particular content of the speech component of an event. Stress analyzer 8 could be used to analyze the stress present in a voice component of an event Parser unit 7 could be usable with any text component of an event. For example, parser unit 7 might be used to identify particular words in text indicating the subject of the text or its priority. Events with text components may include, for example, e-mail or faxes.

It is envisioned that the attribute extractor 1 need not contain all of the units shown in FIG. 1, nor is it limited to those units. Further, the data attribute extractor 5 is envisioned to include any units which provide useful information which will aid decision unit 13 and determine how the particular event should be handled. All the attributes extracted in attribute extractor 1 are then forwarded to characteristic accumulator 10 which accumulates the extracted attributes, as well as state information from state information unit 11 and the time and date from time and date unit 12 to create an event characterization. State information available from state information unit 11 may include such information as the last time an event of this type was received from the particular source and how the event was previously handled, as well as how the user last connected to the system and from where the connection was made. Other information such as the frequency of, e.g., calls from this source can also be retained as state information. For example, if a telephone call comes in from CALLER, and the state information unit 11 indicates that this is the fourth time CALLER has called in the last hour, this information may be relevant to how the call should be handled assuming frequency is related to urgency. The state information unit 11 may receive information from the attribute extractor 1, user connection and input, and even what rules fired in the decision unit 13 in response to an event.

Once a characterization of the event is created by characteristic accumulator 10, the characterization is forwarded to decision unit 13 which decides how the event should be handled based on rules provided by rule engine 17. Decision unit 13 will likely include an expert system, a rule-based learning system, and/or a neural net. In one embodiment, the decision unit 13 is able to create and modify rules in the rule engine 17. It is envisioned that rule engine 17 may include, without limitation, pre-entered (canned) rules, user-entered rules and computer-generated/learned rules. In this manner, content and state-based decision-making can be applied to incoming events, thereby improving the probability that important events will be received in a timely manner. For example, when only events relating to a particular topic or from a particular individual are desired, the decision unit can screen events such that only the relevant events are forwarded. If the decision unit 13 determines not to forward the event, it may be stored in conventional voice mail or an e-mail box or some other appropriate storage unit (not shown). If the decision unit determines that the event should be forwarded to the user, it sends the event to the translation unit 14. The translation unit 14 determines the best media type for forwarding the event, and determines whether the outgoing media type is compatible with the incoming media type in terms of both transport type and data type. If it is not, the translation unit forwards a notification event of the appropriate outgoing media type to the outgoing media interface 16. Outgoing media interface 16 is again a collection of prior art interfaces corresponding to the supported outgoing media. The system then waits for the user to connect, or acknowledge receipt of the notification. If the media types require no translation or after the user has connected, the translation unit 14 sends the event to the user acting merely as a conduit if the connection media is compatible with the event; otherwise, translation unit 14 translates the incoming event to the connection/outgoing media type.

User input 18 provides the user the ability to modify the rule on which the decision unit bases its decisions. It is envisioned that user input can be either explicit or implicit. Explicit user input may directly modify a rule, add a rule, etc. using, e.g., a keyboard attached to the system or by voice commands. Implicit user input includes how the user responds to notification events, how the user connected, etc.

It is envisioned that in some embodiments, the system will be able to learn from implicit inputs. For example, if home phone is in Los Angeles and user connects from a number in the 212 area code, i.e., New York, the system would be able to recognize that the user is not at home and temporarily eliminate the user's home phone as an option for forwarding incoming events. As another example, if user has sent (or retrieved) e-mail from terminal A in the past five minutes, then user's proximity to terminal A may assist in selection of a contact media and channel. It may also give the system insight into how available the user is to receive incoming events.

In one embodiment, translator unit 14 is envisioned to include a media specific array which maps translation of a media event incoming on one media type to a translation scheme for each outgoing media type, and media specific filters which dictate what portion of the event is translated and how the translation is performed to the new media type. The translation unit of one embodiment will include a text to speech unit (TTS), a speech to text unit (STT), an optical character recognition unit (OCR) (image to text), and a graphic converter (e.g. graphic to fax). While a single translation subunit, e.g., OCR, may not be able to translate from the incoming data type to the outgoing data type directly, in combination, it is likely that this set of four subunits will permit most useful translations. One example of a multi-step translation is fax to voice. This can be done by first doing OCR on the fax to get text and then TTS on the text.

Additional units may be provided to format the data for a particular media type. For example, an incoming voice message may be converted to text for output to a text based receiver, format for a pager would be different than format for a conversion to e-mail. While for e-mail the whole voice message might be converted to text and dumped to a display, stored in an e-mail box etc., the pager may only receive converted data in sixteen character segments with a "more" option to prompt more of the message to be sent.

For example, it is not particularly useful to translate a 5,000 word e-mail to send to an alphanumeric pager with a 16 character display. Accordingly, an appropriate filter may require that only the subject and perhaps the author of the e-mail be provided to a pager. In the same example, this might be the notification event, or the notification event may be merely "you have mail" sent over the pager. This second case would require connection or at least acknowledgment (assuming a two-way pager) before additional event translation or forwarding would occur. It is also desirable to permit the user to request a content search of the event if media constraints make it difficult or impossible to deliver the entire event For example, if the event is a ten page fax and the outgoing media is voice phone, it is probably undesirable to "read" the whole fax over the phone. In such case, allowing the user to request with key input or voice command only parts about a particular subject makes the system significantly more robust. In another example, e-mail is selected as the output media for an incoming voice call. A first line of the voice call and possibly one or more extracted attributes are translated real time STT and sent to the chosen e-mail address. The user may then communicate directly with the caller by, e.g., indicating a phone number to which the call should be forwarded or using TTS of the user's input at the connection point in a chat mode and sending the speech response back to the caller.

It is also desirable that the system permit separate components of an event to be handled individually and possibly in more than one way. For example, take the case in which an incoming e-mail includes an audio and a graphic attachment This event has three components (1) text, (2) audio and (3) graphic. For example, if the user can be reached by phone, the text may be converted by TTS and some portion read to the user. The user may be given the opportunity to request more, as well as the opportunity to have audio played, and specify a fax number to which the graphic can be sent once converted. Additionally, the system may print the graphic foils to the office printer and store the e-mail with both attachments in the users e-mail box. Thus, the e-mail is both delivered over a different media type and stored in the normal way.

FIG. 2 shows an exemplary 2×3 translation array in which the incoming event is either a voice phone call or an e-mail text message. Outgoing media types are voice phone, e-mail, or pager. When the selected outgoing media is the same as the incoming media, e.g., voice phone and voice phone call, the event is forwarded directly, and the translation unit acts as a router in the event a channel change is required or a conduit in the event that no channel change is required. When translation between media types is required, the array sets forth how the translation should proceed using the known building blocks of TTS, STT, OCR and graphic conversion to affect the translation and provide the data to the user in a useful/meaningful way. While a 2×3 matrix is shown for illustration, much larger matrices are envisioned within the scope and contemplation of the invention. There are many possible incoming media and outgoing media. The following is a non-exclusive list of possible input devices, output devices, or both: e-mail (comprised of parts), text, audio, graphics, specific program attachments like PowerPoint® or Word®; voice call; voice mail box; pager; fax; cellular phone; packet radio data network; Internet notification applet (customer software using the net); "any" data network (frame relay, TCP/PI, ATM, etc.); touch tone send/receive; computer modem call; home camera; sensor and detectors of various kinds; alarm system; home control system. An array accommodating translation between events generated/received by any or all of these devices is within the scope and contemplation of the invention.

Implementation of the above-described units can be accomplished by using one or more microprocessors. It is also possible and within the scope of the invention to implement the individual functional units as application specific integrated circuits (ASICs). However, to allow maximum flexibility, it is preferred that at least the decision unit be implemented using a microprocessor. This leaves the rule base that can be used/learned nearly unlimited, and decision-making can be caused to match individual user preferences.

Figure 3:
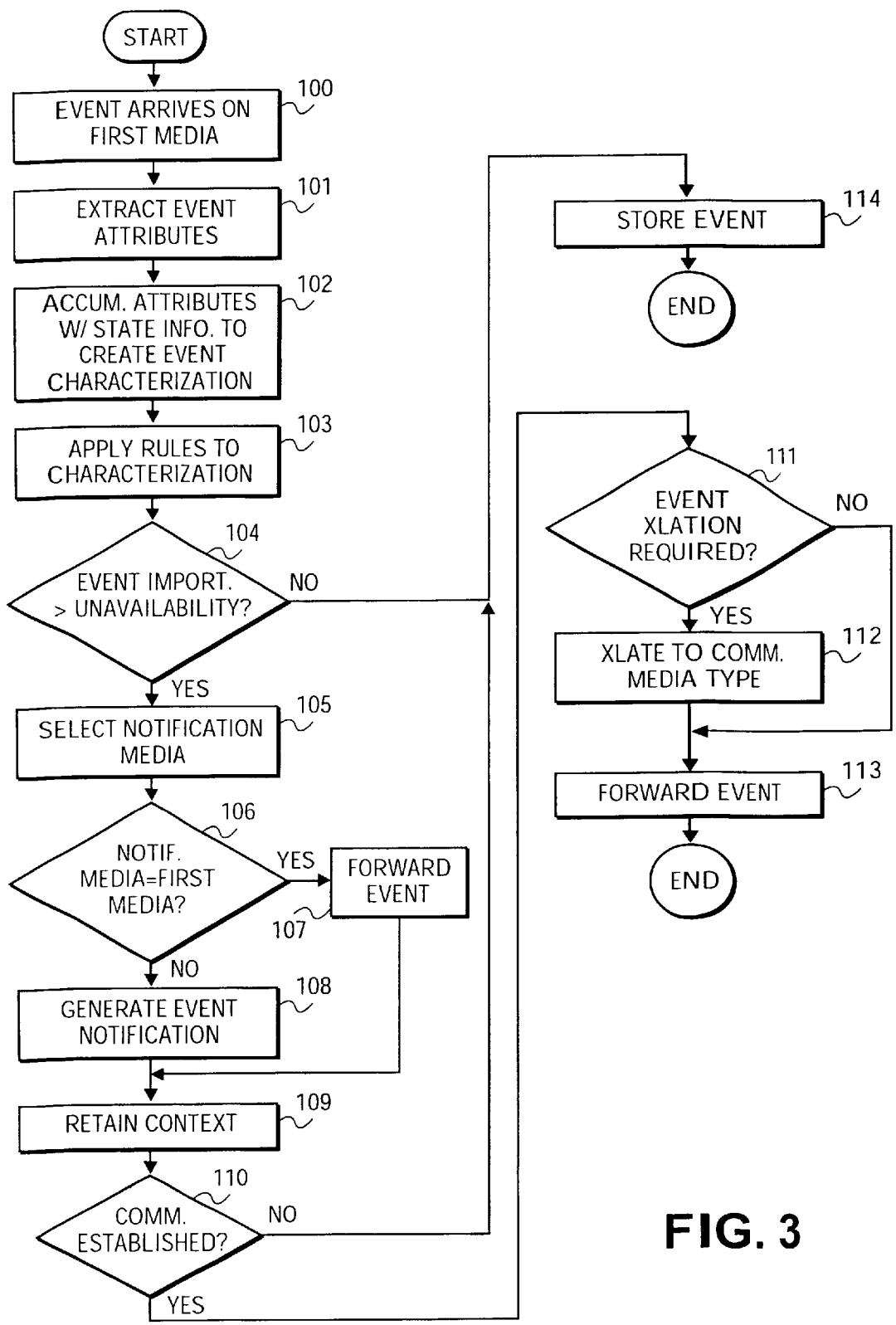
FIG. 3 is a flowchart of operation flow in one embodiment of the invention.

FIG. 3 is a flowchart of operation of one embodiment of the invention. At functional block 100, an event arrives on a first media. At functional block 101, attributes of the event are extracted. At functional block 102, attributes are accumulated with state information to create an event characterization. Rules are then applied to the event characterization to determine how the event should be handled at functional block 103. At decision block 104, a determination is made if the importance of the event is greater than the unavailability of the user. This determination will be based on a number of rules. Such rules include the user-entered and the user-modified rules, as well as preexisting rules and learned rules. These rules may factor in cost of connection such that if a telephone call is made, it may be automatically forwarded to another land-based line, but forwarded to a cellular line only if its importance reaches a predetermined threshold.

If a determination is made at decision block 104 not to forward the event, the event is stored at functional block 114. If it is determined that the event is important enough to forward, a notification media is selected at functional block 105. A decision block 106 is determined whether the notification media is the same as the incoming media. If it is, at functional block 107, the event is forwarded unchanged across a notification media. If the notification media is not the same as the first media, a notification event is generated at functional block 108. At functional block 109, a context in which a notification event or the forwarding of the event occurred is retained as part of the system's state information. A determination is made at decision block 110 whether communication has been established. If communication is not established, the event is stored at functional block 114. The notification event for a second media type may also be stored. For example, if the event was an e-mail and the notification event was created for a telephone medium, the notification event may be stored in voice mail, while the event is stored in an e-mail box. Thus, a user will be notified of the event either when calling voice mail or when logging on to the e-mail account. Analogous situations exist for many other media pairs.

If communication is established, a determination is made at decision block 111 whether event translation is required. If the event translation is required, the event is translated to the communication media type at functional block 112. If no translation is required, the event is forwarded at functional block 113.

In an alternative embodiment of the invention, if communication is not established, the system will iteratively send out notification events along a next best media type until either communication is established or the available media types are exhausted. This modification of the system is within the scope and contemplation of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A system comprising:

an interface for receiving events from a plurality of media;

an attribute extractor coupled to the interface for extracting an attribute from an event received across one of the media wherein the attribute extractor comprises a parser;

a characteristic accumulator coupled to the attribute extractor which accumulates relevant attributes and state information relating to the event; and a decision engine coupled to the characteristic accumulator which determines, based on the attributes and state information, how the event should be handled, the decision engine having adaptive learning capability.

2. The system of claim 1 further comprising:

a translation unit for translating between a first media type of an incoming event to a second media type of an outgoing event.

3. The system of claim 2 wherein the translation unit comprises:

a media specific array to map the first media type to the second media type; and a media specific filter to render a portion of the incoming event relevant to the second media type when the first and second media types are not the same.

4. The system of claim 3 wherein the media specific array and the media specific filter are modified responsive to rules and state information associated with the system.

5. The system of claim 3 wherein the decision engine selects the second media type.

6. The system of claim 2 wherein the translation unit generates a notification event compatible with the second media type responsive to the incoming event being forwarded to the translation unit by the decision unit.

7. The system of claim 2 wherein the translation unit comprises:

an optical character recognition unit;

a text to speech unit;

a speech to text unit; and a graphic to fax unit.

8. The system of claim 1 wherein the attribute extractor, the characteristic accumulator, and decision engine are implemented as a single microprocessor.

9. The system of claim 1 wherein the decision engine includes at least one of an expert system, a rule-based learning system, and a neural net.

10. The system of claim 1 wherein the attribute extractor further comprises:

a voice recognition unit; and a speech recognition unit.

11. The system of claim 1 wherein the adaptive learning capability is based on implicit input.

12. A method of establishing communication between a remote party and a user comprising:

identifying using a parser an attribute of an event received via one of a plurality of media;

grouping the attribute with current state information; and determining using adaptive learning, based on the attribute and state information, a best medium to contact the user.

13. The method of claim 12 further comprising:

translating at least a portion of the event from an incoming media type to an outgoing media type.

14. The method of claim 12 wherein determining is performed using a subset of:

a plurality of pre-recorded rules, a plurality of user-entered rules, and a plurality of computer-generated rules.

15. The method of claim 12 further comprising:

retaining as state information a context in which the event was handled.

16. The method of claim 12 further comprising:

iteratively sending notification events to media types in a hierarchical order until contact is established or all supported media types are exhausted.

17. A system comprising:

an interface for receiving events from a plurality of media;

an attribute extractor coupled to the interface for extracting an attribute from an event received across one of the media, wherein the attribute extractor comprises a stress analyzer;

a characteristic accumulator coupled to the attribute extractor which accumulates relevant attributes and state information relating to the event; and a decision engine coupled to the characteristic accumulator which determines, based on the attributes and state information, how the event should be handled, the decision engine having adaptive learning capability.

18. The system of claim 17 wherein the adaptive learning capability is based on implicit input.

* * * * *

UNITED STATES PATENT AND TRADEMARK OFFICE
CERTIFICATE OF CORRECTION

PATENT NO. : 6,411,696 B1  Page 1 of 1
DATED : June 25, 2002
INVENTOR(S) : Iverson et al.

It is certified that error appears in the above-identified patent and that said Letters Patent is hereby corrected as shown below:

Column 1,
Line 40, delete "categorieed" and insert -- categorized --.

Signed and Sealed this

Seventeenth Day of September, 2002

Attest:

Attesting Officer

JAMES E. ROGAN
Director of the United States Patent and Trademark Office